United States Patent [19]
Lyon et al.

[11] 4,399,010
[45] Aug. 16, 1983

[54] ISOTOPE SEPARATION APPARATUS

[75] Inventors: Richard K. Lyon, Fanwood; Philip N. Eisner, New Providence; William R. I. Thomas, Holmdel, all of N.J.

[73] Assignee: Exxon Research and Engineering Co., Florham Park, N.J.

[21] Appl. No.: 877,877

[22] Filed: Feb. 15, 1978

Related U.S. Application Data

[63] Continuation-in-part of Ser. No. 659,930, Feb. 20, 1976, abandoned.

[51] Int. Cl.$^3$ .............................................. B01D 59/00
[52] U.S. Cl. .......................... 204/157.1 R; 250/423 P; 422/186
[58] Field of Search ............. 204/157.1 R; 250/423 P; 422/186

[56] References Cited

U.S. PATENT DOCUMENTS 3,443,087  5/1969  Robieux et al. ............. 250/423 P X
3,772,519  11/1973  Levy et al. .................. 250/423 P X

OTHER PUBLICATIONS

Jetter, H. et al., Uranium Isotope Separation Using IR-Lasers, Proc. Int. Conf. Uranium Isotope Separation, Mar. 5-7, 1975, London.
Chem. & Eng. News, May 12, 1975, pp. 17-18.
Cohen, K. *The Theory of Isotope Separation as Applied to Large-Scale Production of* $U^{235}$, McGraw-Hill, N.Y., 1951, pp. 1-29.
Moore, C. B., Accounts of Chemical Research, vol. 6, 1973, pp. 323-328.

*Primary Examiner*—Deborah L. Kyle
*Attorney, Agent, or Firm*—Richard I. Samuel; Arnold H. Krumholz

[57] ABSTRACT

This application discloses a method for and an apparatus in which isotopes of an element in a compound are separated from each other while that compound, i.e., including a mixture of such isotopes, flows along a predetermined path. The apparatus includes a flow tube having a beginning and an end. The mixture of isotopes is introduced into the flow tube at a first introduction point between the beginning and the end thereof to flow the mixture toward the end thereof. A laser irradiates the flow tube dissociating compounds of a preselected one of said isotopes thereby converting the mixture in an isotopically selective manner. The dissociation products are removed from the tube at a first removal point between the first introduction point and the end. The dissociation product removed at the first removal point are reconverted back into the compound thereby providing a first stage enriched compound. This first stage enriched compound is reintroduced into the flow tube at a second introduction point between the beginning thereof and the first introduction point. Further product is removed from the flow tube at a second removal point between the second introduction point and the first introduction point. The second introduction point is chosen so that the isotope composition of the first stage enriched compound is approximately the same as that of the compound in the flow tube.

5 Claims, 1 Drawing Figure

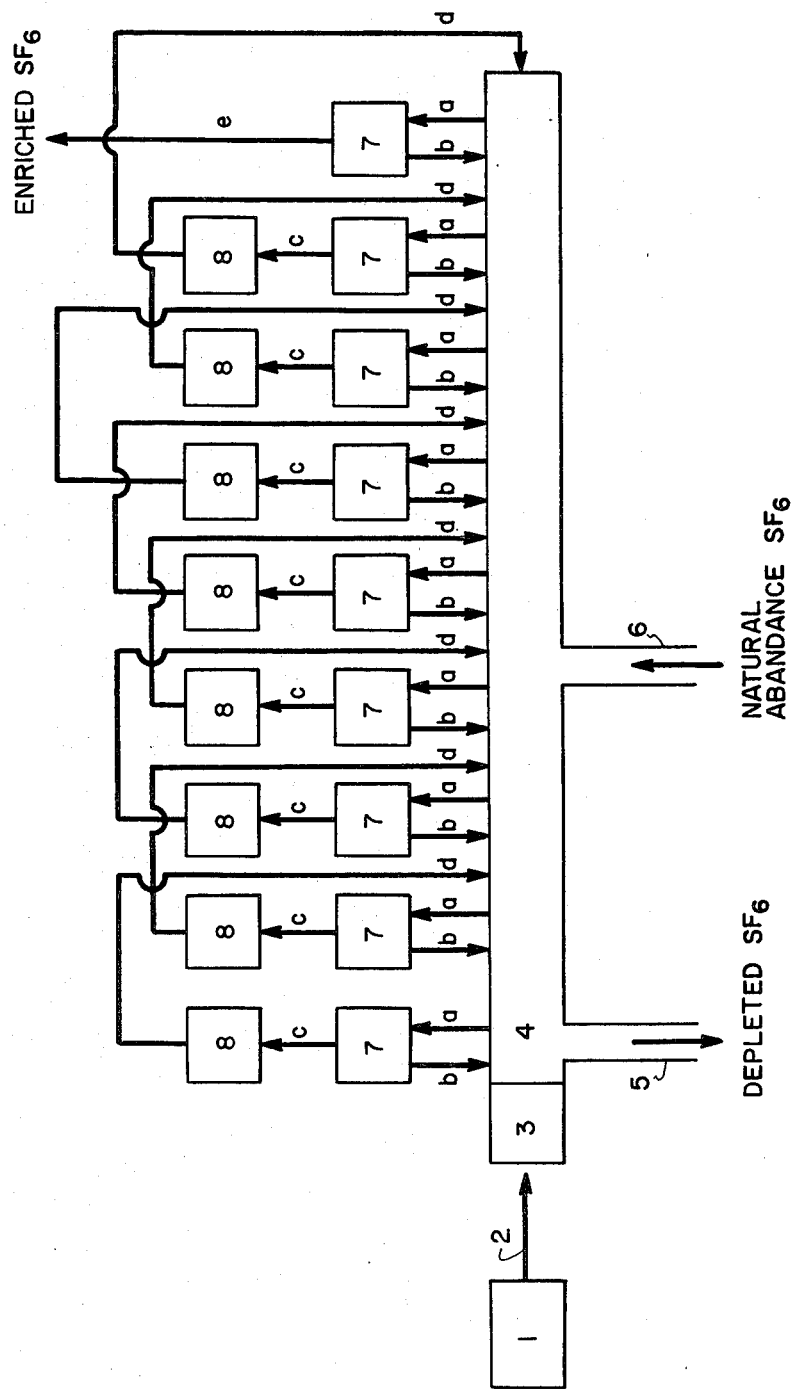

4,399,010

ISOTOPE SEPARATION APPARATUS

This is a continuation-in-part of application Ser. No. 659,930 filed Feb. 20, 1976, now abandoned.

FIELD OF THE INVENTION

This invention relates to a method and apparatus for separating a mixture of isotopes present in a compound, and particularly to a method and apparatus for carrying out the laser induced isotopically selective conversion of gaseous molecules in a manner so as to achieve more than one stage of isotope separation along the length of a laser beam.

BACKGROUND OF THE INVENTION

Over the past few years substantial progress has been made in developing operable techniques for separation of various isotopes by laser induced processes. R. V. Ambartzumian, et al., describe a laser isotope separation process in a paper entitled "Sulfur Isotope Separation With An Enrichment Factor $>10^3$ Caused By Irradiation Of $SF_6$ Molecule By $CO_2$ Laser", which appeared in JETP 21, 375(1975) on Mar. 20, 1975. In this article it is taught that $SFhd 6$ can be isotope-selectively dissociated by a $CO_2$ laser at a power density of from $1-2\times 10^9$ watts per $cm^2$ with the laser tuned to the P(16) laser line (948 $cm^{-1}$). Since that time it has been found that substantially lower power density can be employed. It should be noted that while the Ambartzumian, et al., article refers to $SF_6$, many other laser isotope separation processes have been developed over the last few years including ones for separating isotopes of uranium from gaseous compounds.

The Ambartzumian, et al., article discusses the photodissociation in a static cell. The static cell is a batch process which is not inherently suitable for large scale processing. One problem with batch processing in a static cell is that the amount of separative work done by each successive laser pulse decreases since the absorption characteristics of the gas in the cell is inherently altered from pulse to pulse by the dissociation process. Therefore it would be necessary to either accept the reduced efficiency or have a complex system for readjusting the laser to maintain efficiency. It should further be noted that another consequence of the depletion of the sample within the cell is that the material being acted upon with each successive pulse is less enriched and therefore less susceptible to efficient separation.

U.S. Pat. No. 3,443,087, which issued May 6, 1969 to J. Robieux, et al, entitled "Isotopic Separation Process", suggests an interconnection of several stages of isotope separation according to the methods of fractional purification with reprocessing of the gas streams provided thereby. This process requires separate lasers for each cell. The absorption characteristics of the gas within each of these cells is different, thereby requiring a different adjustment for each laser. This system also suffers from the deficiency that to the extent that the gas within each cell is subject to more than one laser pulse the absorption characteristics within that cell vary from pulse to pulse.

Therefore, it is an object of this invention to provide a method and apparatus for the separation of isotopes by a laser in which either multiple laser pulses or continuous wave radiation can be employed to efficiently separate isotopes without affecting the absorption characteristics of the isotopes mixture being operated upon.

SUMMARY OF THE INVENTION

In accordance with the present invention, this and other objects are accomplished by providing an apparatus and a method for separating the isotopes of an element, the method including the steps of (1) providing an irradiation path, (2) flowing said compound along said irradiation path, (3) irradiating the irradiation path so as to convert said compound in an isotopically selective manner, (4) removing said product from said radiation zone at a removal point between the point of introduction of the compound and the end of the irradiation zone, (5) converting the product removed at said removal point into said compound, said compound being enriched in said selectively converted isotope, (6) returning said isotopically enriched compound to said radiation zone at a second introduction point between the first introduction point and the end of the irradiation zone, and (7) removing the product at a second removal point between the first and second introduction points.

The apparatus in accordance with the present invention includes (1) means for defining an irradiation path; (2) means for introducing the compound at an introduction point; (3) means for irradiating the irradiation path to convert the compound in an isotopically selective manner; (4) means for removing the product at a removal point between the introduction point and the end of the irradiation path; (5) means for converting the product so removed into the enriched compound; (6) means for introducing the enriched compound into the irradiation path at a second introduction point between the beginning of the irradiation path and the introduction point; and (7) means for removing the product at a second removal point between the second introduction point and the original introduction point. This sequence of interconnection can be continued to the extent necessary for the desired result.

DESCRIPTION OF THE FIGURE

For a more complete understanding of the invention, reference should be made to the following detailed description and to the FIGURE, which is a schematic block diagram of an apparatus embodying the method and principles of this invention.

DETAILED DESCRIPTION

The instant invention may be illustrated by the preferred embodiment shown in the FIGURE. Laser radiation of the kind appropriate to the process being run is generated by laser system 1. The radiation 2 passes through a window 3 or other light transmitting device, and thence into a reaction tube 4. In this illustration, the optical path, i.e., irradiation zone, comprises substantially the total volume of the reaction tube 4. Conditions within reaction tube 4, such as temperature, pressure, reactant concentration, etc., are maintained (by means known in the art) within those ranges appropriate to the process being run. The compound which contains the element whose isotopes are being separated is designated throughout the following discussion as being $SF_6$. However, many other compounds and elements (such as $UF_6$) could be processed in the same fashion. Also, the product formed by the chemical conversion of $SF_6$ under laser radiation (i.e., the product which contains said element) is designated $SF_5$, even though $SF_4$ or some other product may result. $SF_6$, as a gas, enters reaction tube 4 via entrance tube 6. The $SF_6$ then entering the reaction tube 4 may be of natural isotopic abundance. As shown, entrance tube 6 is near the middle of reaction tube 4 rather than near the ends. Nevertheless, there is only one direction of net flow of $SF_6$ within the reaction tube 4. This direction of net flow may be either opposite to the direction of travel of laser radiation, as shown in the FIGURE, or parallel to it.

The laser system 1 is a $CO_2$ laser tuned to the P(16) laser line (948 cm$^{-1}$) which coincides with the $^{32}SF_6$ vibrational absorption spectrum but not with the $^{34}SF_6$ vibrational absorption spectrum. As a result of radiation from the laser system 1 in the reaction tube 4 $^{32}SF_6$ dissociates while very little $^{34}SF_6$ dissociates, resulting in $SF_5$ which is substantially enriched in the $^{32}S$ isotope as compared to the $SF_6$. It should be noted that $SF_5$ is not volatile and therefore can be filtered from the remaining $SF_6$.

Distributed along the length of the reaction tube 4 are a number of product recovery means 7, which are connected with the reaction tube 4 by means of conduits a and b. The product recovery means 7 include apparatus therein which draws gas in the reaction tube through conduit a into the product recovery means 7. Each product recovery means 7 filters the gas drawn therethrough and returns the filtered gas through conduit b back into the reaction tube 4 a short distance downstream from where it was removed. Whatever solid material is separated from the gas in the product recovery means 7 is passed by conduit c to convertors 8. The convertors 8 refluorinate the solid material providing $SF_6$ enriched in $^{32}S$. This enriched $SF_6$ is returned to the reaction tube 4 upstream from the place where it was removed, preferably at a point in the flow tube having an isotope mixture equivalent therewith. In this manner a flow of $SF_6$ is established in the reaction tube which has a stepwise gradient of isotope mixture, eventually settling at an equilibrium condition, notwithstanding the fact that the gases are continuously flowing along the paths so described. In this manner the optical characteristics within the reaction tube 4 are maintained constant during the equilibrium operation of the described method and apparatus so that the laser system 1 need not be dynamically adjusted to compensate for absorption characteristics during successive pulses, and yet can be efficiently operated during the entire process. The enriched $SF_6$ is withdrawn from the product recovery means 7 at the extreme right of the FIGURE, while the depleted $SF_6$ is removed from the reaction tube 4 through the pipe 5.

In the preferred embodiment of the invention, the reaction tube 4 is 1000 cm long, and has laser systems 1 located at each end thereof, to provide substantially uniform illumination for approximately 800 cm of the tube. The flow rate within the tube would be 100 cm per second and the lasers would be operated at a pulse repetition rate of 10 pulses per second. With this arrangement only a few percent of the $SF_6$ need be dissociated per pulse so that a power density of substantially less than 1 GW/cm$^2$ may be employed. This reduces the restraints on the laser system and therefore reduces the cost.

While this invention has been described with respect to a particular embodiment thereof, numerous others would become obvious to those of ordinary skill in the art in light thereof.

We claim:

1. A method of operating upon molecules of a compound which includes isotopes of an element having an isotopically shifted infrared absorbtion spectrum associated with said element to provide a product which is enriched in one of the isotopes of said element including the steps of:
   (1) defining an irradiation path, said irradiation path having a beginning and an end;
   (2) introducing said compound into said irradiation path at a first introduction point between said beginning and said end and flowing said compound toward said end;
   (3) irradiating said irradiation path with infrared radiation which is preferentially absorbed by molecular vibrations of said molecules of said compound containing a predetermined isotope of said element, thereby converting said compound to said product in an isotopically selective manner;
   (4) removing said product from said irradiation path at a first removal point between said first introduction point and said end;
   (5) converting said product removed at said removal point into said compound thereby providing a first stage enriched compound;
   (6) introducing said first stage enriched compound into said irradiation path at a second introduction point between said beginning and said first introduction point; and
   (7) removing said product from said irradiation path at a second removal point between said second introduction point and said first introduction point.

2. The method as defined in claim 1 also including the steps of:
   (8) converting said product removed at said removal point into said compound thereby providing a second stage enriched compound;
   (9) introducing said second stage enriched compound into said irradiation path at a third introduction point between said beginning and said second introduction point; and
   (10) removing said product from said irradiation path at a third removal point between said third introduction point and said second introduction point.

3. The method as defined in claim 2 in which said second introduction point is chosen so that the isotope composition of said first stage enriched compound is approximately the same as that of the compound in the irradiation path at said second introduction point.

4. Apparatus for operating upon molecules of a compound which includes isotopes of an element and having an isotopically shifted infrared absorbtion spectrum associated with said element to provide a product which is enriched in one of the isotopes of said element including:
   (1) means for defining an irradiation path, said irradiation path having a beginning and an end;
   (2) means for introducing said compound into said irradiation path at a first introduction point between said beginning and said end so as to flow said compound toward said end;
   (3) means for irradiating said irradiation path with infrared radiation which is preferentially absorbed by molecular vibrations of said molecules of said compound containing a predetermined isotope of said element, thereby converting said compound to said product in an isotopically selective manner;
   (4) means for removing said product from said irradiation path at a first removal point between said first introduction point and said end;

(5) means for converting said product removed at said removal point into said compound thereby providing a first stage enriched compound;
(6) means for introducing said first stage enriched compound into said irradiation path at a second introduction point between said beginning and said first introduction point; and
(7) means for removing said product from said irradiation path at a second removal point between said second introduction point and said first introduction point.

5. The apparatus as defined in claim 4 also including:

(8) means for converting said product removed at said second removal point into said compound thereby providing a second stage enriched compound;
(9) means for introducing said second stage enriched compound into said irradiation path at a third introduction point between said beginning and said second introduction point; and
(10) means for removing said product from said irradiation path at a second removal point between said third introduction point and said second introduction point.

* * * * *